United States Patent
Bush et al.

[15] 3,665,792
[45] May 30, 1972

[54] METHOD AND APARATUS FOR FORMING FOAM MATERIAL

[72] Inventors: James S. Bush, 901 Longridge Road, Oakland, Calif. 94610; Robert S. Mason, 522 Sheldon, El Segundo, Calif. 90245

[22] Filed: Feb. 20, 1970

[21] Appl. No.: 13,137

[52] U.S. Cl............................................83/1, 83/19, 83/176
[51] Int. Cl..........................................................B26d 7/08
[58] Field of Search....................83/1, 5, 4, 19, 176, 17, 18, 83/175, 20, 21

[56] References Cited

UNITED STATES PATENTS

| | | | |
|---|---|---|---|
| 1,145,654 | 7/1915 | Anderson | 83/18 X |
| 2,404,731 | 7/1946 | Johnson | 83/176 X |
| 3,245,293 | 4/1966 | Kirchner | 83/1 |
| 3,311,007 | 3/1967 | McGee | 83/176 X |

*Primary Examiner*—Frank T. Yost
*Attorney*—Harris Zimmerman

[57] ABSTRACT

A method and apparatus for forming foam material, such as polyurethane or foam rubber, into any desired shape, including multi-curved objects, e.g. a contoured dress form. A mass of preformed foam material is forced through an opening having a peripheral configuration corresponding to that of the finished article. A die used to force the mass through the opening is of the general contour desired in the end article. After a portion of the original mass is forcibly urged through the opening, such extruded portion is sheared away from the remaining mass in the plane of the opening. After the shearing operation, the cut-away portion of the foam will assume the contours of the die, but in effect be a mirror image thereof.

In a second phase of the invention, the article produced in the manner above described is positioned over a die opening having a periphery smaller than the periphery of the article by some predetermined amount. The article is forced through such opening with a flat die which is caused to stop from the plane of the opening by the same amount. The extruded portion is again sheared away in the plane of the opening. After the shearing, the article remaining will have the same peripheral configuration and the same external contours, but will have a thickness corresponding to the aforesaid predetermined amount.

2 Claims, 9 Drawing Figures

Patented May 30, 1972
3,665,792
2 Sheets-Sheet 1
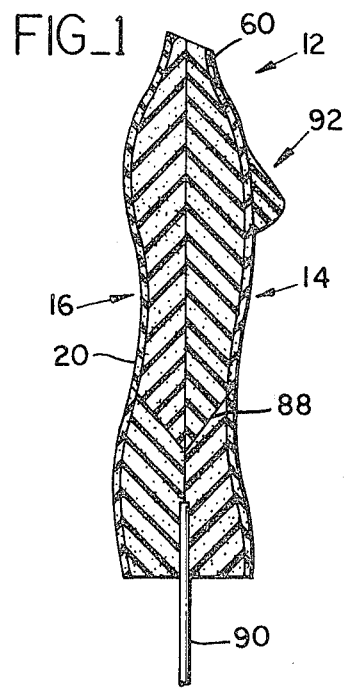
FIG_1
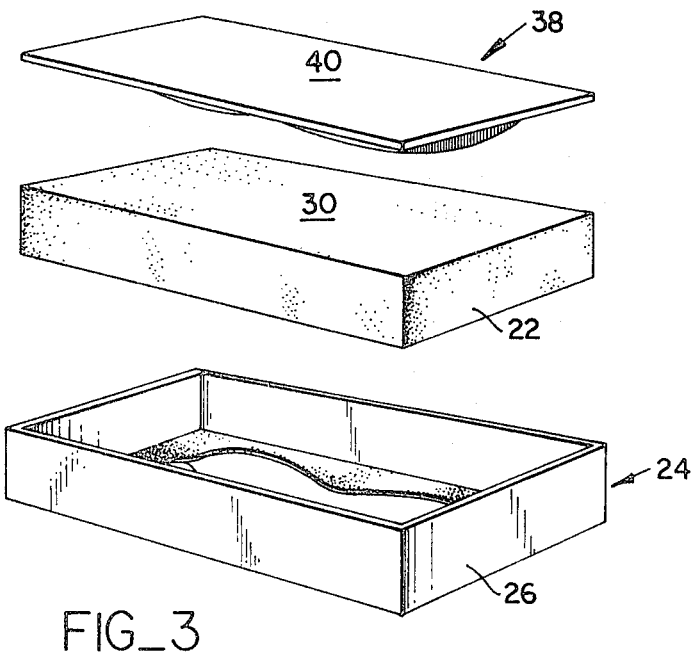
FIG_3
FIG_2
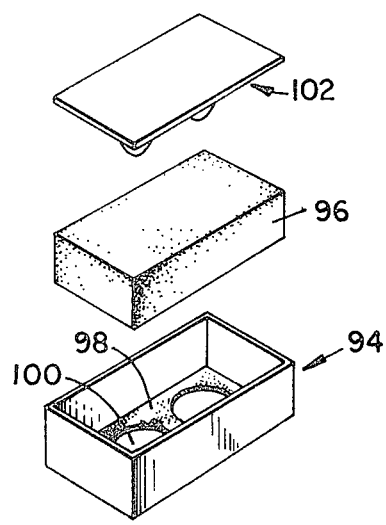
FIG_4
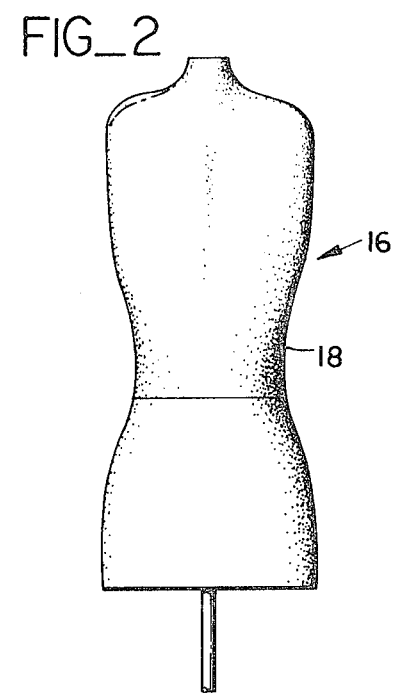
INVENTORS
JAMES S. BUSH
ROBERT S. MASON
BY
*Harris Zimmerman*
ATTORNEY Patented May 30, 1972 3,665,792
2 Sheets-Sheet 2
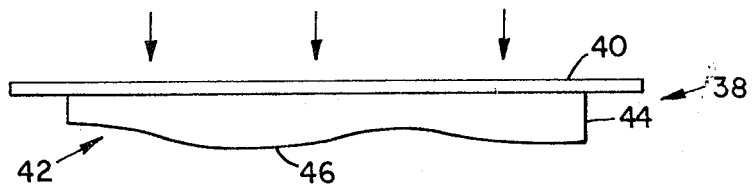
FIG_5
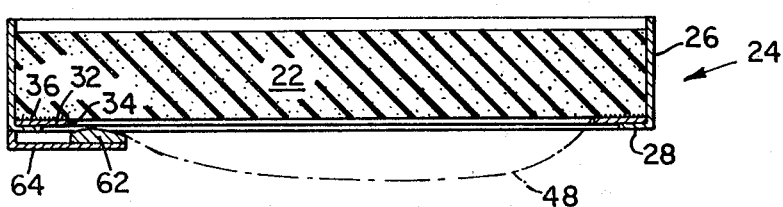
FIG_6
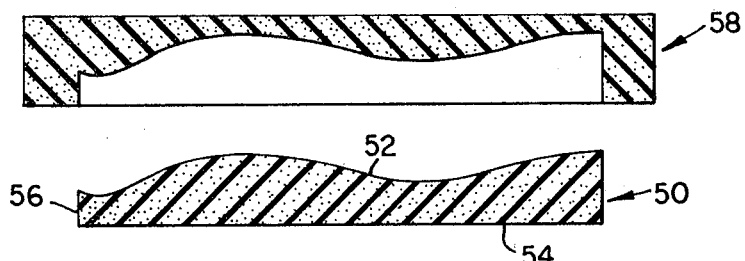
FIG_7
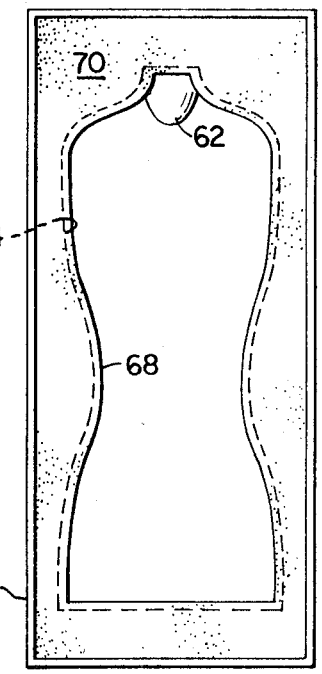
FIG_9
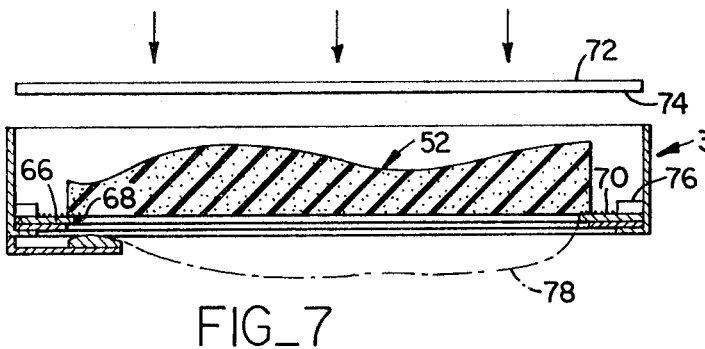
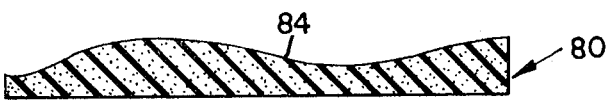
FIG_8
INVENTORS
JAMES S. BUSH
ROBERT S. MASON
BY
ATTORNEY

METHOD AND APARATUS FOR FORMING FOAM MATERIAL

BACKGROUND OF THE INVENTION

In many instances it is necessary or desirable to produce an article formed of foam material, such as polyurethane or the like. Where the article is simple in design, the same may be readily cut from a larger mass of the material with existing foam cutting techniques. However, where the article possesses curved surfaces, such as might be found in a dress form which is representative of the actual body contours, no satisfactory systems are presently available to produce a multi-curved article without providing costly and sophisticated injection molding apparatus, which is hardly practicable for producing relatively few articles.

In accordance with the teachings of the present invention, a multi-curved article can be formed from a mass of foam material using extremely simple apparatus and procedures, and without requiring the application of heat, excessive pressures, or other costly and time consuming procedures.

Also, as a further feature of this invention, it is equally simple to provide an article having a desired peripheral outline and a multi-curved contour in which the thickness of the article is uniform throughout.

As an additional object or feature of the invention, a new and novel type of customized dress form can be produced, using the method and apparatus to be described, which possesses features not found in other dress forms, and which can be easily modified or changed to produce irregularities, bulges, etc., to correspond with the specific shape of the person for whom the form is made.

For purpose of explanation, this invention will be described in connection with the production of a dress form, but it should be made clear that the invention is not limited thereto since the techniques about to be described are applicable to forming many other foam articles.

THE DRAWINGS

FIG. 1 is a side elevational view of a dress form constructed in accordance with the teachings of the present invention;

FIG. 2 is a rear elevational view of the form;

FIG. 3 is an exploded perspective view of the apparatus utilized to produce a contoured article, more specifically one half of a dress form;

FIG. 4 is an exploded perspective view of the apparatus for producing the breast portions of a dress form;

FIG. 5 is a side elevational view of the apparatus for producing a contoured article;

FIG. 6 is a view showing the produced article and the remaining mass of foam material after the shearing operation;

FIG. 7 is a view similar to FIG. 5 showing the apparatus for receiving the article to thereafter modify the same to produce an article of uniform thickness;

FIG. 8 is a view of the two pieces of foam material after shearing the extruded portion shown in FIG. 7; and FIG. 9 is a plan view of the mold used in FIG. 7.

DESCRIPTION OF THE PREFERRED EMBODIMENT

As above mentioned, the apparatus and method of the present invention is adapted to produce a multi-curved foam article such as the dress form 12 shown in FIGS. 1 and 2 of the drawings. As will be later explained, the present system produces an article in which one surface may have a multi-curve configuration while the opposite surface is flat. Consequently, in producing the form 12, the same is made in two halves, namely, the front form portion 14 and the rear form portion 16. Such portions may then be adhesively or otherwise secured together to produce the finished article.

For purpose of explanation and orientation, the configuration of the form, and of each portion thereof may be said to have a periphery or silhouette 18 representing the front or rear appearance of the form, and a multi-curved contour 20 representing the side elevational view of the form. Thus, the terms "periphery" and "contour" will be used herein to distinguish the form shape in the plan view as shown in FIG. 2 from the side view shown in FIG. 1.

Further details of the form will be later discussed after first describing the method of producing the form portions 14 and 16. Since the same general procedure is followed for making each portion, only portion 14 will be described in detail. It will also be understood that while the method is described in connection with the production of dress forms, it is equally applicable to the production of other foam articles which may have any desired peripheral shape and any desired contour. It might also be explained at this time that in connection with dress forms, a limited number of different shaped forms may be produced, e.g. variations in overall size, etc., and with the novel form 12, the individual form may then be simply and readily customized to conform to the exact shape of the user.

Referring to FIGS. 3 and 5 of the drawings, a mass or block 22 of foam material, such as polyurethane or foam rubber is placed in a mold 24. The mold has a plurality of side walls 26, an open top, and a flange 28 extending inwardly from the bottom of the side walls. The size and shape of the mold is such that the mass of foam 22 may be received within the side walls in relatively close relationship, and with the upper surface 30 of the foam within the confines of the walls.

A plate 32 is supported in the flange 28 and such plate is provided with a cut-out portion having a periphery 34 corresponding to periphery 18 of the article to be produced. It will also be noted that the upper surface of plate 32 surrounding the opening is roughened as indicated at 36, and the lower surface of the foam block is supported on such roughened surface. To force the block 22 through the opening defined by periphery 34 of the plate, a die member 38 is utilized. Such member includes a rigid planar rectangular sheet 40 adapted to be received within the mold walls 26, and extending downwardly therefrom and secured to the lower surface of the plate is a die element 42 having a periphery 44 corresponding to that of plate periphery 34 and a contoured lower surface 46 corresponding to the desired contour 20 of the form 12 or other article. Element 42 is of a rigid form retaining material, such as a rigid plastic which can be readily worked to provide the desired contour.

With the mass of foam inserted into the mold and supported on the plate 32, die 38 is forced downwardly into the upper surface 30 of the foam and due to the compressive force created, a portion 48 of the mass will be forced or extruded downwardly through the plate opening. It is interesting to observe that notwithstanding the die contour 46, the extruded portion does not possess any corresponding configuration. It is also noted that the roughened plate surface 36 effectively holds the mass of foam in place and prevents any sliding of the mass along the plate towards the opening therein. Die 38 may be moved into its operative engagement with the foam in any suitable conventional method, e.g. by mechanical, hydraulic or pneumatic pressure.

While still under pressure from the die, the extruded portion 48 extending below the plate opening is sheared or cut off in the general plane of the opening with a conventional foam shear. Due to the varying internal stresses imposed during the application of pressure, as soon as the portion 48 is cut away, it will assume the shape illustrated at 50 in FIG. 6, i.e., with the upper surface 52 along which the planar cut was made possessing a mirror image contour to die surface 46, a lower planar surface 54, and a periphery 56 corresponding to the periphery 34 of the plate opening. In other words, the article 50 will have the same periphery, contour and shape as die element 42, but inverted through 180°. When the die pressure is released, the foam mass remaining in the mold will have the shape indicated by 58 of FIG. 6. This excess portion 58 is subsequently cut up and used for other purposes later to be described. As will be understood, the article 50 corresponds in periphery and contour to form portion 14 or 16, and if no further modifications were required, could be used as the final product.

As an auxiliary feature in the production of a dress form, the abrupt narrowing of the neck portion 60 may require the provision of a stationary die element 62 extending subjacent the appropriate portion of the plate opening and against which the foam block is forced. Element 62 may be supported on a bracket 64 extending inwardly from one of the mold side walls 26.

Two of the articles 50 corresponding in shape to form portions 14 and 16 could be placed with the flat surfaces 54 in contact and secured together to provide a dress form 12. However, practically all human figures vary from one another, and while two individuals may both be the same height, waist measurement, bust size and the like, the distribution of their dimensions will vary. Accordingly, while the articles 50 may be generally correct, they will not precisely conform to the shape of the body for whom the form is being made.

Means are accordingly provided to permit modification of the form portions, and in this connection, reference is made to FIGS. 7 through 9 of the drawings. The same mold 24 and plate 32 is utilized, and on top of plate 32 is placed a second plate 66 provided with an opening or cut-out portion having a periphery 68 corresponding to that of periphery 34, but spaced uniformly inwardly therefrom by a predetermined distance, such as three-fourths of an inch. The article 50 is then placed in plate 66 and will thus be supported thereon along marginal portions of its lower flat surface 54. The upper surface 70 is roughened for the reasons previously described. A flat rigid die 72 is then forced downwardly against the upper contoured surface 52 of article 50, and such die is moved downwardly until its lower surface 74 is spaced from the upper surface of plate 66 by a distance equal to the lateral spacing between the peripheries 34 and 68 of the two plates. Spacer blocks 76 may be used to thus limit die penetration into the mold. Application of die pressure will force or extrude a portion 78 of article 50 through the opening 68, and again, such extruded portion is sheared or cut off in the general plane of the opening. The sheared away portion will immediately take the form and shape illustrated at 80 in FIG. 8 with a flat lower surface 82 and a contoured upper surface 84, notwithstanding the fact that the upper surface was cut in a single plane. Article 80 is a solid mass of foam and is substantially identical to article 50 except its periphery is smaller and its thickness between surfaces 82 and 84 is less by the same amount.

Upon release of pressure on die 72, the portion of article 50 remaining in the mold will have the periphery and contour of article 50 but will actually constitute a hollow shell 86 complementary to article 80 with the thickness of the shell wall being three-quarters of an inch or whatever other distance separates the openings in the two plates and the height of the spacers 76.

The member 80 is inserted in the shell 86 and a diagonal cut 88 is made through the assembly. Two such assemblies are then secured together as illustrated in FIG. 1 with the flat surfaces of each in abutting relationship. The entire unit may be superimposed on a suitable shaft 90 comprising part of a stand or support.

To modify the base shape, the excess foam material 58 may be cut into small pieces or plugs and pushed between the shell 86 and insert 80 from the top of the form or through the cuts 88 to thereby alter the external configuration of the form.

The bust portion 92 of the form is preferably made separately from the remaining form portions as generally indicated in FIG. 4 of the drawings. The procedure followed corresponds to that discussed above, and comprises a mold 94, a foam block 96, a plate 98 having openings 100 therein, and a die element 102 having a contour corresponding to that of the desired bust portion 92. After the extruding and shearing operations, the produced articles may be secured to the front form portion 14.

We claim:

1. A method of forming foam material which consists of supporting a mass of foam material over an opening having a peripheral configuration corresponding to the desired periphery of the produced article, applying pressure to said mass with a member having a mass-engaging contour corresponding to the desired contour of the produced article and forcing a portion of said mass through said opening, then cutting such portion of the mass away from the remaining mass while maintaining said pressure in the general plane of said opening, supporting said cut portion of the mass over an opening having a peripheral configuration similar to but smaller than the periphery of said cut portion, applying pressure to said portion with a relatively flat element to thereby force some of said cut portion through said smaller opening, and then cutting such forced material from the previously cut portion while maintaining said pressure in the general plane of said smaller opening.

2. A method as set forth in claim 1 including releasing of said pressure on said portion and in which the remaining part of said previously cut portion comprises a shell complementary to and adapted to receive the forced material cut therefrom.

* * * * *